No. 768,263.                                                                                        Patented August 23, 1904.

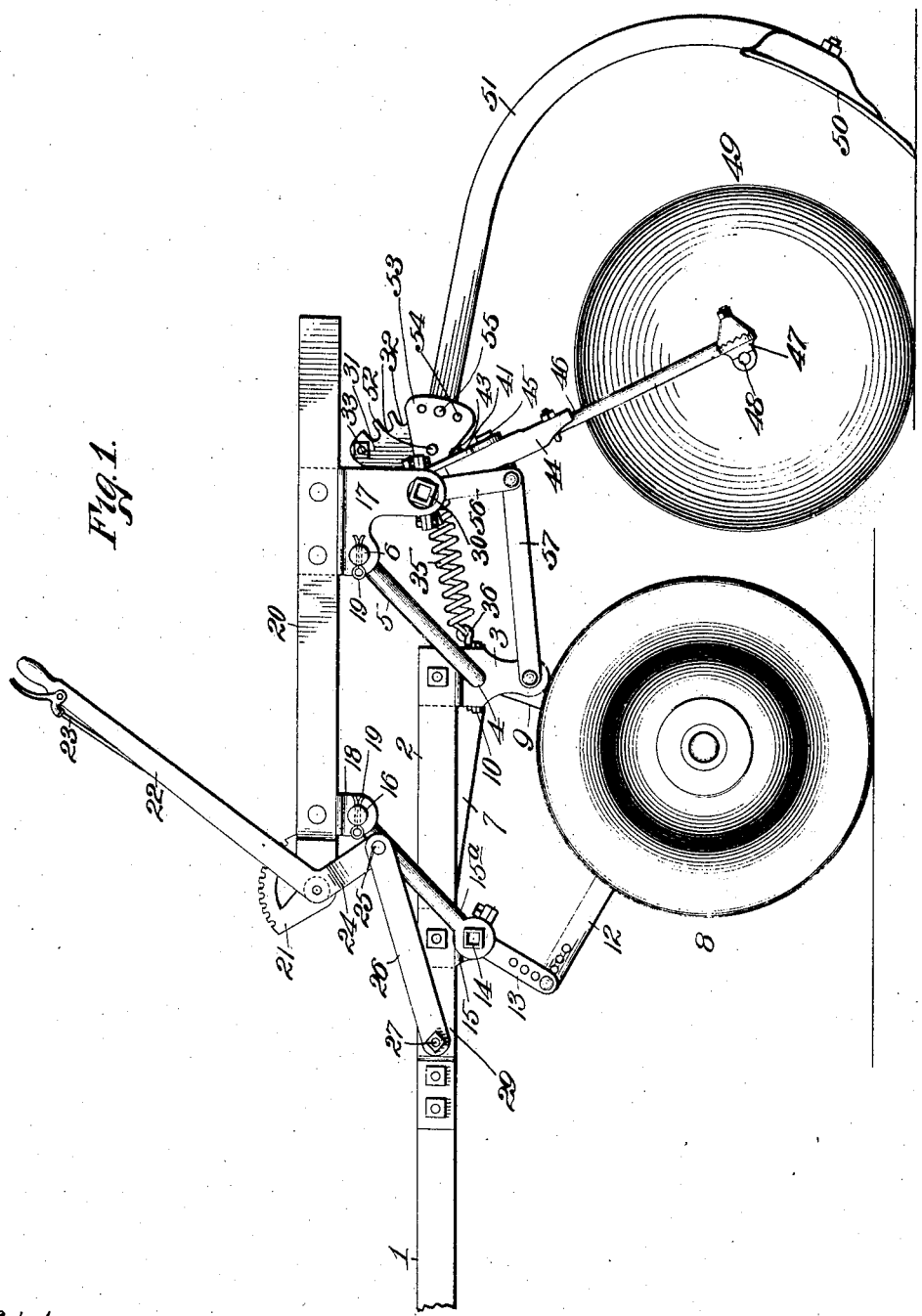

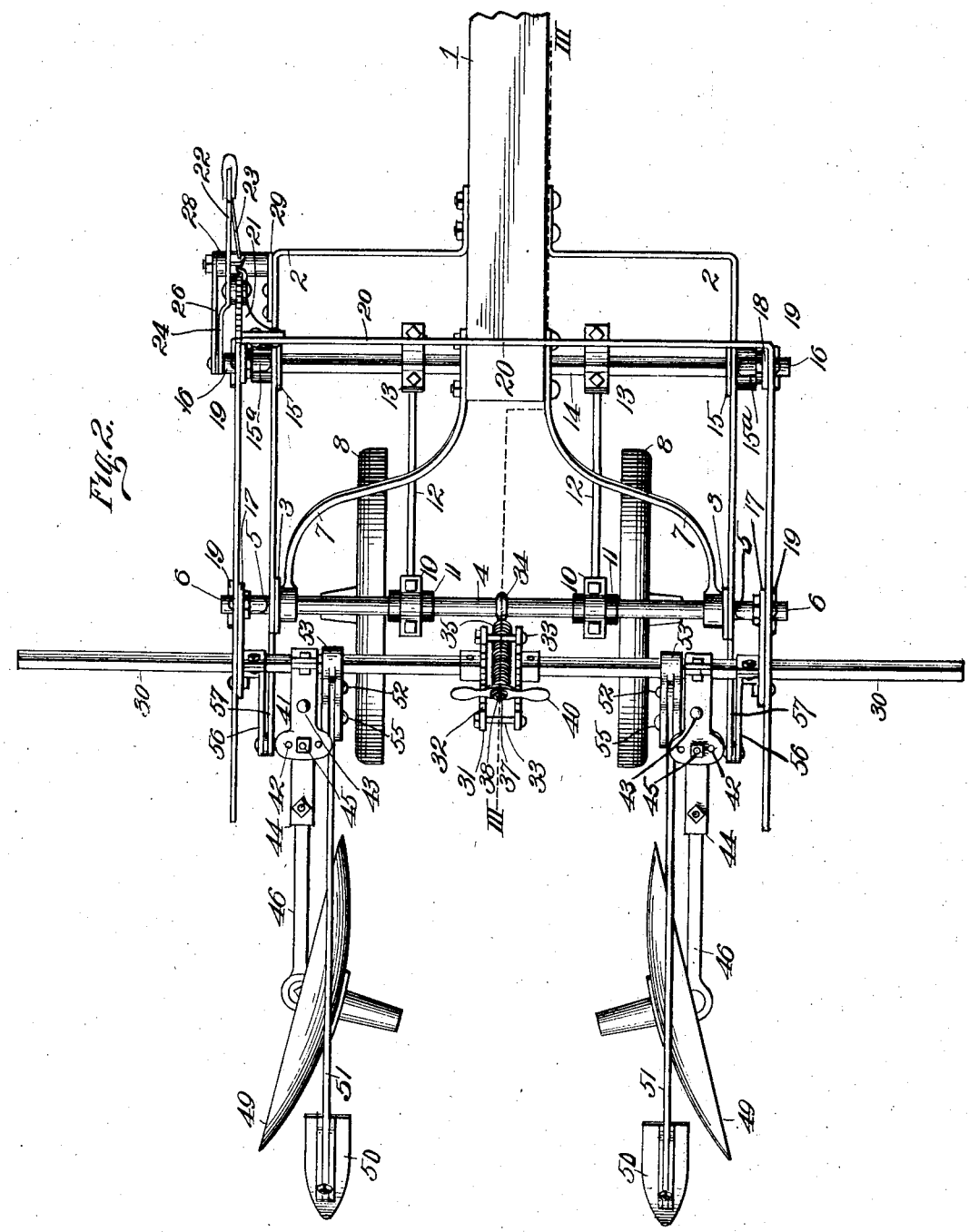

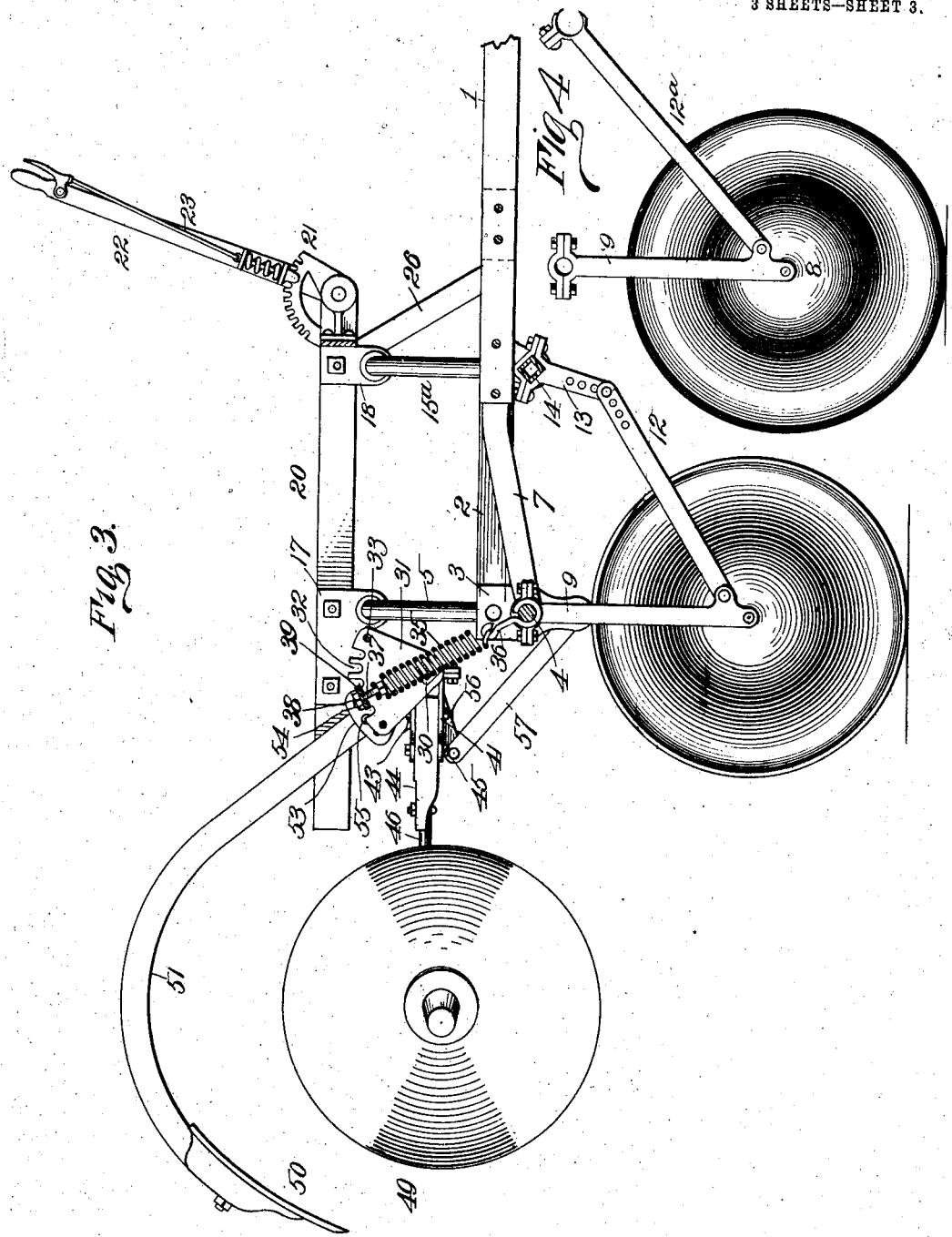

UNITED STATES PATENT OFFICE.

THOMAS H. CAMERON, OF LINCOLN, NEBRASKA.

STRADDLE-ROW CULTIVATOR.

SPECIFICATION forming part of Letters Patent No. 768,263, dated August 23, 1904.

Application filed January 20, 1904. Serial No. 189,935. (No model.)

*To all whom it may concern:*

Be it known that I, THOMAS H. CAMERON, a citizen of the United States, residing at Lincoln, in the county of Lancaster and State of Nebraska, have invented certain new and useful Improvements in Straddle-Row Cultivators, of which the following is a specification.

This invention relates to straddle-row cultivators of that type embodying ground-wheels, disks, and shovels and automatically adjustable to accommodate irregularity of distance between the rows; and my objects are to produce a machine of this character which is positive, reliable, and efficient in operation, which can be manipulated so as to raise or lower the cultivating appliances with a minimum exertion on the part of the operator, and which imposes on the necks of the draft-animals no pressure in a vertical direction.

A further object is to produce a machine of this character of simple, compact, strong, and durable construction.

With these and other objects, as hereinafter appear, the invention consists in certain novel and peculiar features of construction and combinations of parts, as hereinafter described and claimed, and in order that it may be fully understood reference is to be had to the accompanying drawings, in which—

Figure 1 represents an inner side view of the right-hand gang of a cultivator embodying my invention, the cultivating appliance being shown as lowered for engagement with the ground. Fig. 2 is a top plan view of the gang with the cultivating appliance raised to inoperative position. Fig. 3 represents a vertical longitudinal section on the line III III of Fig. 2. Fig. 4 is a detail view showing a modified form of connection between the wheel-carrying arms and the front rock-shaft.

In the said drawings, 1 designates the tongue, and 2 a pair of angle-bars secured rigidly at their front ends to opposite sides of and in the same horizontal plane as the tongue, the longitudinal arms of said angle-bars being parallel and projecting beyond the rear end of the tongue a considerable distance. These angle-bars constitute the lower frame of the machine, and journaled in bearing-brackets 3, rigidly secured to and depending from the rear ends of said frame, is a transverse rock-shaft 4, having at the outer sides of said frame upwardly-projecting crank-arms 5, terminating in outwardly-projecting arms 6, and journaled on said shaft at the inner side of the bearing-brackets are bars 7, bolted at their front ends to the rear end of the tongue and serving to brace and stiffen the side portions of the frame.

8 designates ground-wheels of the usual or any preferred type, journaled upon the lower ends of arms 9 in the usual or any preferred manner, and said arms 9 are formed at their upper ends with bearing-boxes 10, which are journaled on the shaft and are prevented from lateral movement by the collars 11, mounted adjustably upon the shaft.

Pivotally connected to the lower ends of arms 9 are a pair of links 12, having an adjustable connection at their front ends with the depending arms 13, secured rigidly to and forming cranks of the transverse shaft 14, said shaft being preferably of the rectangular gas-pipe type and journaled at its ends in bearing-brackets 15, secured rigidly to and depending from the side portions of the frame-bars 2.

15$^a$ designates crank-arms secured rigidly upon the ends of shaft 14 outward of said frame or formed integral therewith, if desired, these crank-arms extending parallel with crank-arms 5 and terminating in outwardly-projecting arms 16, like arms 6, the latter being journaled in bearing-brackets 17 and the former in bearing-brackets 18, depending rigidly from a horizontally-disposed U-shaped frame 20, hereinafter termed the "upper" frame, spring-cotters 19 or their equivalents engaging arms 6 and 16 to guard against disengagement of said arms and said brackets.

At its front and inner corner the upper frame rigidly carries a sector 21, on which is pivoted a lever 22, provided with the usual latch mechanism 23 to lock the lever rigidly at the desired point on the sector. This lever is provided with a foot portion 24, which is bent outward to avoid conflict with the contiguous end portion 16 of rock-shaft arms

15ª and is fulcrumed, as at 25, on the front end of a swinging fulcrum-bar 26, said bar being pivoted, as at 27, on the inwardly-projecting boss 28 of a bracket 29, riveted or otherwise rigidly secured to the front and inner corner of the lower frame.

The cultivating-appliance-carrying shaft consists of two rectangular gas-pipes 30, each journaled in one of the brackets 17 below and rearward of the point of said brackets, forming journals for the outwardly-projecting ends of crank-arms 5. Secured upon the inner end of each gas-pipe section 30 is a quadrant-shaped casting 31, provided with a series of notches 32 in its periphery, said castings being connected rigidly together at opposite ends of said series of notches by bolts 33, so that the two sections of the shaft shall operate as one.

34 designates a collar loosely engaging shaft 4 at its middle, and 35 a retractile spring connected at its lower end to said collar, as at 36, the upper end of said spring embracing and holding tightly the head of a bolt 37, and secured adjustably upon said bolt below nut 38 is a cross-bar 39, formed at opposite sides of its center with handle portions 40 capable at their points of smallest diameter of fitting in registering notches 32 of the segmental castings, the power of the spring of course holding the bar interlocked with said castings. The object of the retractile-spring connection between shaft 4 and shaft 30 is hereinafter explained.

Secured rigidly on shaft 30 and of course capable of lateral adjustment thereon, as customary in this type of machine, are bifurcated brackets 41, having their rear ends laterally enlarged and provided with a series of holes 42 concentric of the pivot-bolts 43, bridging the bifurcations and carried by said brackets.

44 represents arms fitting in said bifurcated brackets and pivoted on the bolts 43 thereof, so as to be capable of swinging laterally, said arms being adapted to be secured at the desired point of adjustment by the bolts 45, which they carry and which engage one series or another of holes 42, as will be seen by reference to Fig. 2. Journaled in the arms 44 in the usual manner are arms 46, and swiveled to the rear ends of said arms are castings 47, carrying shafts 48 as journals for the cultivating-disks 49.

The cultivating-shovels 50 are secured in any suitable manner to the beams 51, pivoted, as at 52, for vertical operation between the arms of segmental castings 53, secured rigidly on shaft 30 in any suitable manner, said castings having a series of holes 54 arranged concentrically of pivots 52, pins or bolts 55, carried by the beams, engaging one set or another of said holes for the purpose of securing the shafts in position to cultivate at different depths.

Secured rigidly to shaft 30 are arms 56, pivotally connected by links 57 with the lower ends of bearing-brackets 3, the object of this connection being to rotate shaft 30 whenever lever 22 is manipulated for the purpose of lowering or raising frame 20.

When the machine is traveling to or from the field, or, in other words, when not performing its cultivating function, the parts are disposed substantially as shown in Fig. 3— that is, with the crank-arms 5 and 15ª substantially vertical, with the ground-wheels centrally below shaft 4, and with the spring-retracted locking-bar 39 engaging notches of segments 31 above the plane occupied by the centers of shafts 4 and 30, so that the retractive power of said spring shall be utilized as an aid to crank-arms 56 and links 57 in holding the cultivating appliances elevated, the frames of course being locked in such relation by the engagement of latch mechanism 23 with sector 21. It will furthermore be seen by reference to Fig. 3 that with the parts thus disposed the weight of the machine is about balanced, because the seat-plank (not shown and of any suitable or preferred type common in this class of machines) from which the driver is supported is slightly forward of crank-arms 6.

To throw the cultivating appliances into operative relation with the ground, the lever, in approximately the position shown in Fig. 3, is grasped by the driver and drawn rearwardly, which action by reason of the fact that said lever is supported from the upper frame and fulcrumed from the lower one, tends to throw said frames in opposite directions, the lower one forward and the upper one rearward, and in this connection it will be noticed that combined with this rearward movement of the lever and materially assisting in effecting the adjustment described is the forward pull of the draft-animals on the lower frame, the result being the driver is enabled to lower the cultivating appliances with a very slight exertion of power on the lever. In fact, after the inertia of the parts has been overcome by moving the upper frame just enough to dispose the upper ends of the crank-shafts slightly rearward of their bridge portions, the weight of the driver, the upper frame, and parts supported directly therefrom, are sufficient to lower the cultivating appliances to the ground, the weight of said parts being sufficient to overcome the resistance offered to the initial part of such movement by the retractile spring 35, it being understood that said spring offers resistance to such movement until locking-bar 39 occupies the same plane as shaft 30 and the bridge portion 4 of the rear crank-shaft, after which said spring materially assists such lowering action, and in this connection it will be noticed that to obtain this differential action of the spring it is necessary to rotate shaft 30 downward and rearward as it descends with the upper frame. This independent rotative action of said shaft is effected because of the toggle-joint connection between said shaft and a fixed point on the lower framework—viz., the lower ends of bearing-brackets 3, the crank-arms 56, and the links 57, constituting such toggle-joint. It will thus be seen that gravity is assisted in embedding the cultivating appliances in the ground by the retractive power of spring 35 and also that the operator's leverage is greatest when the cultivating appliances are on the ground and about to be forced therein, because at such time the power is applied almost directly endwise on the swinging fulcrum 26 and that at such time said fulcrum is substantially parallel or may be by properly proportioning the parts with the lower frame. As a still further aid in the manipulation of the cultivating appliances the ground-wheels roll forward from their position vertically under shaft 4, this disposition of said wheels being effected because their carrying-arms are pivoted on said shaft and have their lower ends connected by the toggle constituted by link 12 and crank-arm 13 with shaft 14.

When the machine is in operation, as shown in Fig. 1, with the greater portion of the weight on the cultivating appliances and rearward of the carrying-wheels, it is drawn forward with the imposition of practically no neck weight on the team, and the greater the resistance on the action of the cultivating appliances the less the weight on the necks of the animals, said weight being objectionable because it quickly results in making the necks of the animals sore.

In raising the cultivating appliances out of the ground by means of the lever the combined rearward movement of the carrying-wheels and forward movement of the upper frame eventually throws the greater portion of the weight forward the carrying-wheels, so that it is practically all imposed on the latter, and consequently may be drawn perfectly balanced, so that the neck-yoke shall not come up in the faces of the draft-animals. In about the first half of this forward movement the resistance of spring 35 must be overcome, and then when the weight is greatest the resistance of the spring ceases and immediately afterward said spring coöperates in the elevating operation, as will be readily understood, the transference of the power of the spring to the point on the segments above the plane occupied by shafts 4 and 30 assisting the operator in the latter part of the elevating movement and in the rearward movement of the ground-wheels to their original position vertically under shaft 4.

It will be seen that there are three positive avenues to force the cultivating appliances to their work independent of the lever—first, the weight of the driver and the upper frame with the parts directly supported therefrom; second, the resistance of the cultivating appliances to upward movement after their contact with the ground, and, third, the toggle-joint connection between the rear crank-shaft and shaft 30.

The tendency of the ground-wheels to roll rearwardly under the resistance offered to forward movement of the machine under ordinary conditions of the soil is not sufficient to overcome the tendency of the cultivating appliances to remain embedded in the ground, and for this reason the machine will operate under such conditions of the soil without locking the lever by means of the latch mechanism, and therefore relieves the disk arms and shovel-beams of a great amount of strain ordinarily imposed on them when locked when passing across ditches and other depressions in the ground, and in this connection the spring coöperates in holding said appliances yieldingly in the ground, and thus constitutes a fourth avenue independent of the lever in holding the machine to its work.

When the lever is unlatched, it is apparent that in crossing a ditch or other depression and the carrying-wheels roll therein the disks and shovels yield upwardly relatively, so that as the ground-wheels pass up out of the ditch or depression and the disks and shovels enter the same successively they sustain the weight of the driver, the upper frame, and directly-connected parts, but are relieved of the entire strain which would be imposed upon them by the draft of the animals if the lever was locked. The cultivating appliances thus cross the ditches in a flexible condition and perform their proper functions at all times.

By adjusting the locking-bar with relation to the notched segments, so that the strain shall always be below the plane of shafts 4 and 30, the spring can be utilized exclusively for resisting upward movement of the upper frame and the parts supported therefrom, or by adjusting said locking-bar a sufficient distance above said plane with relation to the segments the spring can be caused to always exert an upward pull upon the upper frame and the parts supported thereby, it being obvious, of course, that the adjustment of said bar is effected by grasping its handle portions or ends 40, so as to stretch the spring and then move the bar rearward or forward to permit it to enter the desired notches of the segments. By pulling forward on said spring at all times it is obvious that there is no possibility of an abrupt drop of the cultivating appliances at any time, the spring in such action obviously acting as a cushion. Furthermore, the tension of the spring can be varied by the proper adjustment of nut 38.

The cultivating appliances and the wheels can be adjusted laterally in an obvious manner to accommodate cultivation for the first time and second time over the field, and the machine is also adapted to be equipped with the usual fender (not shown) as forming no part of the invention.

In the modified form shown in Fig. 4 it will be seen that the ground-wheel arms are held rigidly in a vertical position by reason of the fact that the front ends of the links 12$^a$ are connected directly to shaft 14 instead of forming a part of a toggle-joint connection between said shaft and the ground-wheel arms. In this construction the ground-wheel arms always maintain their position vertically under the rear crank-shaft, making necessary a slightly-greater exertion of power on the part of the operator to lower the cultivating appliances to operative position, but simplifying and slightly cheapening the construction by dispensing with the crank-arms 13.

From the above description it will be apparent that I have produced a straddle-row cultivator embodying the features of advantage enumerated as desirable, and while I have illustrated and described the preferred embodiment of the same it is to be understood that it is susceptible of change as regards its proportion, detail construction, and arrangement of the parts without departing from its spirit and scope or sacrificing any of its advantages.

Having thus described the invention, what I claim as new, and desire to secure by Letters Patent, is—

1. In a straddle-row cultivator, a tongue, a wheeled frame attached thereto, crank-shafts journaled in said frame and having their arms projecting upwardly, an upper frame journaled on said arms, a rock-shaft supported from the upper frame, cultivating appliances carried thereby, a toggle-joint between said shaft and the lower frame to impart rotary movement to said shaft as the upper frame is raised or lowered, a lever mounted on said upper frame, and a swinging fulcrum for said lever, mounted on the lower or tongue-carrying frame.

2. In a straddle-row cultivator, a tongue, a wheeled frame attached thereto, crank-shafts journaled in said frame and having their arms projecting upwardly, an upper frame journaled on said arms, a rock-shaft supported from the upper frame, cultivating appliances carried thereby, a toggle-joint between said shaft and the lower frame to impart rotary movement to said shaft as the upper frame is raised or lowered, a retractile-spring connection between the lower frame and said shaft, a lever mounted on said upper frame, and a swinging fulcrum for said lever, mounted on the lower tongue-carrying frame.

3. In a straddle-row cultivator, a tongue, a wheeled frame attached thereto, crank-shafts journaled in said frame and having their arms projecting upwardly, an upper frame journaled on said arms, a rock-shaft supported from the upper frame, cultivating appliances carried thereby, a toggle-joint between said shaft and the lower frame, a segment carried by said rock-shaft, a retractile spring connected at its front end to the wheeled frame, and adjustably connected at its rear end to said segment, a lever mounted on said upper frame, and a swinging fulcrum for said lever, mounted on the lower tongue-carrying frame.

4. In a straddle-row cultivator, a tongue, a wheeled frame attached thereto, crank-shafts journaled in said frame and having their arms projecting upwardly, an upper frame journaled on said arms, a rock-shaft supported from the upper frame and comprising two alined portions, notched segments rigidly secured on the inner ends of said sections and rigid connections between the upper and lower corners of said segments, a retractile spring connected at its front end to the wheeled frame, a cross-bar connected to the rear end of said spring and adapted to engage registering notches in said segments, cultivating appliances mounted on said shaft, a toggle-joint between the shaft and the wheeled frame, a lever supported from the upper frame, and a swinging fulcrum for said lever, supported from the lower or wheeled frame.

5. In a straddle-row cultivator, a tongue, a wheeled frame attached thereto, crank-shafts journaled in said frame and having their arms projecting upwardly, an upper frame journaled on said arms, a rock-shaft supported from the upper frame and comprising two alined portions, notched segments rigidly secured on the inner ends of said sections and rigid connections between the upper and lower corners of said segments, a retractile spring connected at its front end to the wheeled frame, a cross-bar connected to the rear end of said spring and adapted to engage registering notches in said segments, cultivating appliances mounted on said shaft, a toggle-joint between the shaft and the wheeled frame, a lever supported from the frame and provided with a latch mechanism, a sector carried by the upper frame for engagement with said latch mechanism, and a swinging fulcrum for said lever, supported from the lower or wheeled frame.

6. In a machine of the character described, a tongue, a frame carried thereby, crank-shafts journaled in said frame and having their arms projecting upwardly, ground-wheel-carrying arms journaled at their upper ends on the rear shaft, a toggle connection between said arms and the front shaft, an upper frame journaled on the upper ends of said crank-shafts, cultivating appliances supported from said upper frame, a lever supported from the upper frame, and a swinging fulcrum for said lever, supported from the lower frame.

7. In a machine of the character described, a tongue, a wheeled frame carried thereby, crank-shafts journaled in said frame and having their arms projecting upwardly, ground-wheel-carrying arms journaled at their upper ends on the rear shaft, a toggle connection between said arms and the front shaft, an upper frame journaled on the upper ends of said crank-shafts, a rock-shaft supported from the upper frame and equipped with cultivating appliances, a toggle-joint between said rock-shaft and the lower frame, a lever supported from the upper frame, and a swinging fulcrum for said lever, supported from the lower frame.

8. In a machine of the character described, a tongue, a wheeled frame carried thereby, crank-shafts journaled in said frame and having their arms projecting upwardly, ground-wheel-carrying arms journaled at their upper ends on the rear shaft, a toggle connection between said arms and the front shaft, an upper frame journaled on the upper ends of said crank-shafts, a rock-shaft supported from the upper frame and equipped with cultivating appliances, a toggle-joint between said rock-shaft and the lower frame, a retractile-spring connection between the lower frame and said rock-shaft, a lever supported from the upper frame, and a swinging fulcrum for said lever supported from the lower frame.

In testimony whereof I affix my signature in the presence of two witnesses.

THOMAS H. CAMERON.

Witnesses:
CHARLES A. GOSS,
HARLEY G. MOORHEAD.